US006370395B1

(12) United States Patent
Steen

(10) Patent No.: US 6,370,395 B1
(45) Date of Patent: Apr. 9, 2002

(54) INTERACTIVE OFFICE NAMEPLATE

(75) Inventor: Paul A. Steen, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/272,848

(22) Filed: Mar. 19, 1999

(51) Int. Cl.[7] .................................... H04M 1/00

(52) U.S. Cl. ....................... 455/556; 455/419; 455/557; 340/7.55; 340/7.58

(58) Field of Search ................................ 455/418, 419, 455/466, 556, 557, 566, 31.2, 31.3, 38.2, 38.4, 66; 345/158, 903

(56) References Cited

U.S. PATENT DOCUMENTS

| | | | | |
|---|---|---|---|---|
| 5,729,214 A | | 3/1998 | Moore | 340/905 |
| 6,021,310 A | * | 2/2000 | Thorne | 455/31.3 |

FOREIGN PATENT DOCUMENTS

| | | | | |
|---|---|---|---|---|
| FR | 2 673 309 | | 8/1992 | |
| JP | 04 303291 | | 10/1992 | |
| JP | 08 258469 | | 10/1996 | |
| JP | 410285090 A | * | 10/1998 | H04B/5/04 |
| WO | WO 92/03820 | | 3/1992 | |
| WO | PCT/US00/06980 | | 6/2000 | |

* cited by examiner

*Primary Examiner*—Lee Nguyen
(74) *Attorney, Agent, or Firm*—Gregory A. Stevens, P.C.

(57) ABSTRACT

An interactive office nameplate includes at least one of a receiver for receiving cellular wireless signals and a wireline interface for receiving wireline signals. The nameplate further includes a display for presenting information on an individual associated with the interactive office nameplate. A messaging module in the nameplate is responsive to the wireless and/or wireline signals to actuate the display to display a text message relating to the individual associated with the nameplate. A user interface further enables the preprogramming of predetermined messages within the display module or the clearing of messages presently contained within the display.

20 Claims, 3 Drawing Sheets

INTERACTIVE OFFICE NAMEPLATE

BACKGROUND OF THE INVENTION

1. Technical Field of the Invention

The present invention relates to electronic office nameplates, and more particularly, to interactive office nameplates capable of being accessed both remotely and locally.

2. Description of Related Art

Current methods for identifying an individual's office or cubicle utilize either a nameplate and/or a whiteboard that provides the individual's name and may allow someone to write a message to notify others of the whereabouts of the cubicle or office occupant or an intended time of arrival. This is not sufficient to provide for up-to-date information by an individual that is no longer near his office and is unable to manually mark information onto the whiteboard. Thus, if the office occupant is not present, more up-to-date information is not available and cannot be provided.

Another method for providing more up-to-date arrival information or information describing reasons for a delay and an expected time of arrival involves placing a message on the cubicle or office occupant's desk phone greeting or message line. This requires an individual to call the office occupant's phone and listen to the greeting. This method of providing up-to-date status of an individual's location or intended arrival time is cumbersome as well as non-intuitive to fellow employees. Many employees would not think of calling the office occupant's phone message system to determine their current whereabouts. Furthermore, once the office or cubicle occupant returns, they are required to access the phone messaging system and go through all the steps required to change back to their standard greeting. Thus, some improved means for notifying fellow employees of an office or cubicle occupant's location and potential arrival times would greatly benefit the overall office communication environment.

SUMMARY OF THE INVENTION

The present invention overcomes the foregoing and other problems with an interactive office nameplate for providing information to individuals approaching an office or cubicle on the current location and status of the cubicle or office occupant. The nameplate includes a one-way cellular receiver for receiving cellular wireless signals transmitted from an individual wishing to update information presented on a display associated with the nameplate. The display presents information describing an office or cubicle occupant's present location and when they may return. Alternatively, or in addition to the wireless receiver, a wireline interface may connect a computer to the interactive office nameplate enabling an individual to download information from the computer onto the display of the nameplate. This information could be provided from a computer within the office or cubicle or from a remotely accessing computer via a phone line.

A messaging module within the nameplate is responsive to signals received by the cellular transceiver or the wireline interface. The messaging module actuates the display to display a text message relating to the individual associated with the nameplate. The messaging module may include voice recognition capabilities enabling actuation of the display of text messages responsive to spoken voice data received over the cellular receiver. The messaging module may also include a number of predetermined messages which are automatically displayed in response to signals from the wireless transceiver or the wireline interface.

A user interface on the front panel of the interactive office nameplate enables a user to clear messages from the text display, initiate predetermined messages or program data within the interactive office nameplate. Using the above described apparatus, more up-to-date and useful information is provided to individuals desiring to know the present whereabouts and status of the occupant of the office or cubicle.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
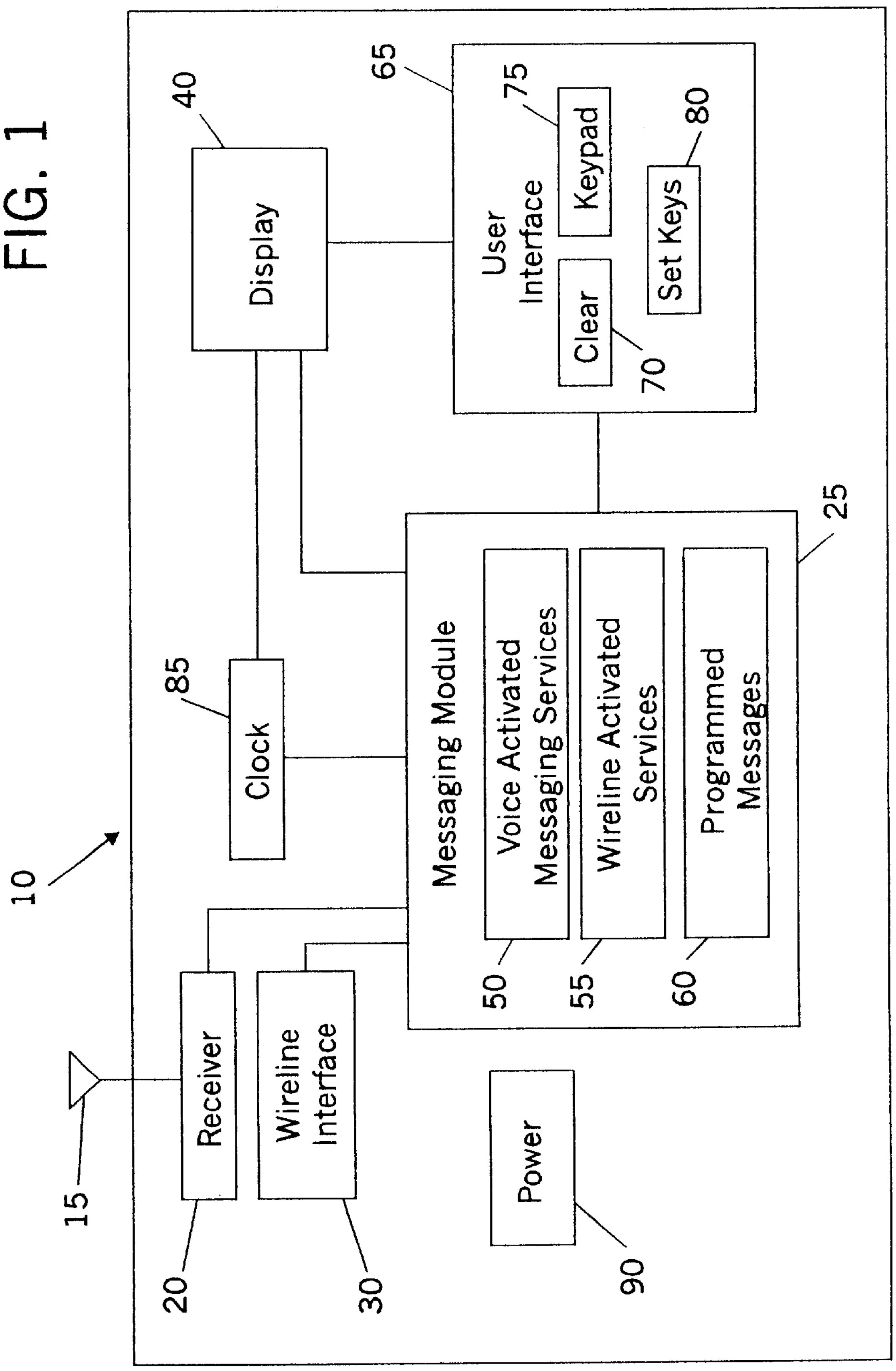
FIG. 1 is a functional block diagram of the interactive office nameplate.
Figure 3:
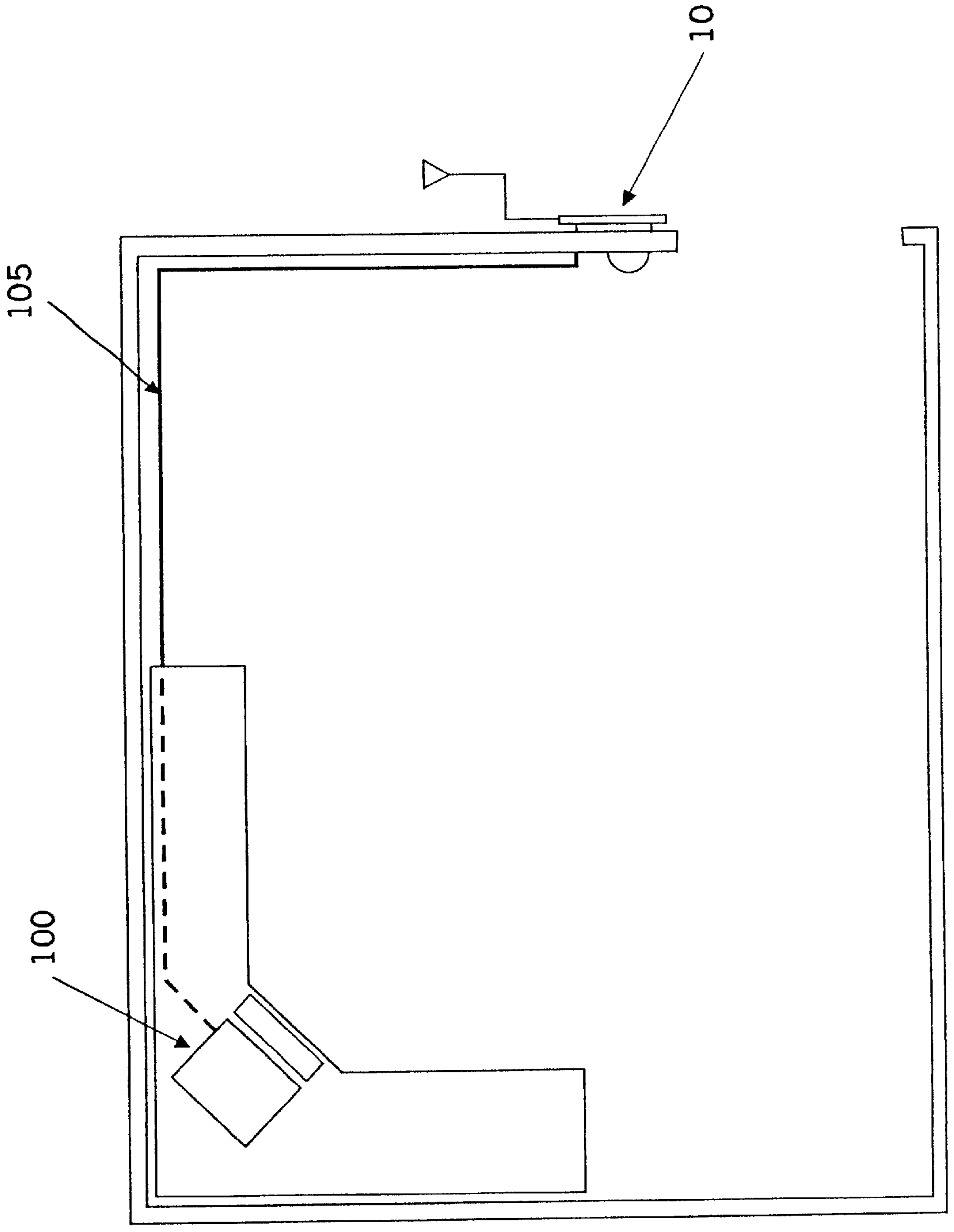
FIG. 3 is an illustration of an interactive office nameplate having a wireline connection to an office personal computer.

Referring now to the Drawings, and more particularly to FIG. 1, there is illustrated a functional block diagram of the interactive office nameplate 10 of the present invention. The interactive office nameplate 10 includes an antenna 15 for receiving wireless cellular signals at a cellular receiver 20. While the present invention is described with respect to receiving a cellular signal, any wireless receiving technology could be used. The received signals are forwarded to a messaging module 25 for further processing. Alternatively, or in addition to cellular receiver 20, the interactive office nameplate 10 may include a wireline interface 30 providing an interconnection with a personal computer 100 as shown in FIG. 3. In this manner, an individual can enter information into the interactive office nameplate 10 from a personal computer 35 in the office or can remotely access the interactive office nameplate 10 via another computer (not shown) over a phone line.

The signals from either the receiver 20 or wireline interface 30 are input into a messaging module 25 which controls a display 40 for providing text information relating to the occupant of the office or cubicle on which the interactive office nameplate 10 is placed. The messaging module 25 may consist of hardwired circuitry or software to provide the functionality which will be more fully discussed below. The messaging module 25 includes voice activated messaging services 50 which are responsive to voice data received via the cellular receiver 20. The voice activated messaging services 50 would prompt an individual to enter spoken information for presentation upon the display 40 as a text message. This information would be spoken at a remote location (not shown) and transmitted to the interactive office nameplate 10 where it would be received by the receiver 20 and antenna 15. This information is provided to the voice activated messaging services 50 within the messaging module 25 such that the voice data can be converted into a text message for the display 40.

In an alternative embodiment, text data messages can be transmitted over the cellular link between a remote location (not shown) and the cellular transceiver 20 using, for example, SMS message services. The downloaded textual data is processed by the messaging module 25 and presented by the display 40. The messaging module 25 may also include wireline activated services 55 responsive to information provided over the wireline interface 30. The wireline activated services 55 receives information downloaded from a personal computer located within the office or remotely and causes the received data to be displayed on the display 40.

The messaging module 25 also includes a database of preprogrammed messages 60 which can be automatically displayed in response to an input from the cellular receiver 20, wireline interface 30 or an input from a local user interface 65. The preprogrammed messages can include messages such as "out to lunch", "back in one hour", "in the lab", etc. and may be selectively programmable by the individual associated with the interactive office nameplate 10 in order to suit the messages to their particular needs.

The user interface 65 includes several components enabling full utilization of the interactive office nameplate 10. A clear button 70 enables an individual to clear the messages presented upon the display 40. Pressing the clear button 70 would generate a signal to the messaging module 25 causing the display to be cleared. A number of key tag buttons 75 (more fully illustrated in FIG. 2) enable the user to press a button to display one of the predetermined messages 60 described previously with respect to the messaging module 25. A set of programming keys 80 enable the programming of information within the interactive office nameplate 10. For example, using the programming keys 80, an individual could program the predetermined messages 60 within the messaging module 25, set a time and date associated with the interactive office nameplate or initialize an occupant's name and cubicle or office number on the nameplate.

An internal clock 85 enables the tracking of time of day, day, month, and year within the interactive nameplate 10. This information may optionally be displayed upon the display 40 as desired. Power circuitry 90 provides power to the interactive office nameplate 10. The power circuitry 90 may take the form of a battery or other self-contained power unit placed within the nameplate 10, or alternatively, may comprise an a/c power connection via a cord to a standard power outlet.

Figures 2, 2A:
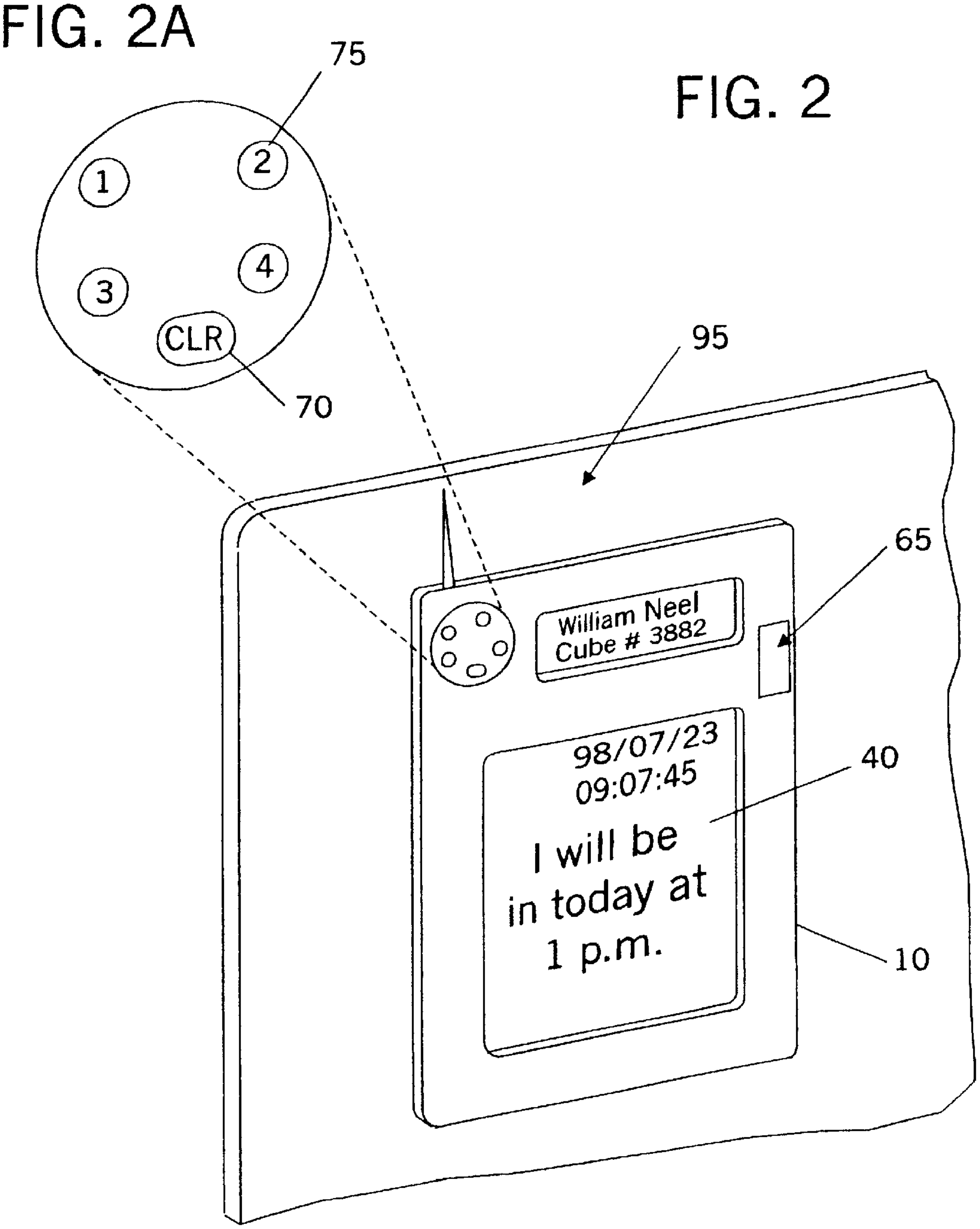
FIG. 2 is a perspective view of the interactive office nameplate.

Utilizing the above described apparatus, as shown in FIG. 2, the interactive office nameplate 10 may be placed upon a wall 95 outside of an individual's cubicle or office. In this case, the display 40 indicates that the individual associated with this cube has the name of "William Neel" and he resides in "cube #3882". Information has been actuated within the nameplate 10 to indicate that Mr. Neel will be in at 1 PM. The present time and date are also indicated.

While the nameplate illustrated in FIG. 2 only includes the wireless connection capabilities. In an alternative embodiment, the interactive office nameplate 10 could be attached to an office personal computer 100 as illustrated in FIG. 3. In this case, the interactive office nameplate 10 is again mounted on the wall of the cubicle 95 as described previously. However, a further connection between the interactive office nameplate 10 and a personal computer 100 is provided through a network line 105 from the personal computer. In this way, the user could enter information into the interactive office nameplate 10 from the personal computer 100.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An interactive office nameplate comprising:

a receiver for receiving wireless signals;

a display for presenting information on an individual associated with the interactive office nameplate;

a user interface enabling clearing of the display in response to an input; and a messaging module responsive to the wireless signal for actuating the display to display a message relating to the individual associated with the interactive office nameplate and further responsive to input from the user interface for clearing the displays, such that anyone in the vicinity of the workspace of the individual associated with the interactive office nameplate can view the display.

2. The interactive office nameplate of claim 1 further including a wireline interface for receiving input signals from an attached computer.

3. The interactive office nameplate of claim 2, wherein the messaging module is further responsive to input signals from the attached computer to actuate the display to display a message relating to the individual associated with the interactive office nameplate.

4. The interactive office nameplate of claim 1, wherein the messaging module includes voice recognition capabilities enabling actuation of a text message on the display corresponding to voice data received as the wireless signal.

5. The interactive office nameplate of claim 1, wherein the messaging module further includes at least one predetermined message for display in response to the wireless signal.

6. The interactive office nameplate of claim 1, wherein the user interface further enables entry of information to be presented by the display.

7. The interactive office nameplate of claim 1, further including an internal clock for providing time, day, month and year.

8. The interactive office nameplate of claim 1 further including a battery for powering the messaging module and the display.

9. An interactive office nameplate comprising:

a receiver for receiving wireless signals relating to an individual associated with the interactive office nameplate;

a wireline interface for receiving wireline signals relating to the individual associated with the interactive office nameplate;

a display for presenting information on the individual associated with the interactive office nameplate; and a messaging module responsive to the wireless signal and the wireline signal for actuating the display to display a text message relating to the individual associated with the interactive office nameplates, such that anyone in the vicinity of the workspace of the individual associated with the interactive office nameplate can view the display.

10. The interactive office nameplate of claim 1, further including a user interface enabling clearing of the display.

11. The interactive office nameplate of claim 10, wherein the user interface further enables entry of information to be presented by the display.

12. The interactive office nameplate of claim 9, wherein the messaging module includes voice recognition capabilities enabling actuation of a text message on the display corresponding to voice data received as the wireless signal.

13. The interactive office nameplate of claim 9, wherein the messaging module further includes at least one predetermined message for display in response to the wireless or wireline signal.

14. The interactive office nameplate of claim 9 further including an internal clock for providing at least one of time, day, month and year.

15. The interactive office nameplate of claim 9 further including a battery for powering the messaging module and the display.

16. An interactive office nameplate comprising:

a receiver for receiving wireless signals;

a wireline interface for receiving wireline signals;

a display for presenting information on the individual associated with the interactive office nameplate;

a user interface for clearing the display in response to an input; and a messaging module responsive to the wireless signal and the wireline signal for actuating the display to present a text message relating to the individual associated with the interactive office nameplate, the messaging module further responsive to the input from the user interface for clearing the display; and a plurality of pregenerated messages within the messaging module and displayable in response to a selected input from each of the receiver, the wireline interface and the user interface, such that anyone in the vicinity of the workspace of the individual associated with the interactive office nameplate can view the display.

17. The interactive office nameplate of claim 16, wherein the messaging module includes voice recognition capabilities enabling actuation of a text message to the display corresponding to voice data received as the wireless signal.

18. The interactive office nameplate of claim 16, wherein the user interface further enables entry of information to be presented by the display.

19. The interactive office nameplate of claim 16 further including an internal clock for providing at least one of time, day, month and year.

20. The interactive office nameplate of claim 16 further including a battery for powering the messaging module and the display.

* * * * *